United States Patent
Ozdemir et al.

(10) Patent No.: US 12,554,031 B2
(45) Date of Patent: Feb. 17, 2026

(54) QUALITY CONTROL AND PRECONDITIONING OF SEISMIC DATA

(71) Applicant: WesternGeco LLC, Houston, TX (US)

(72) Inventors: Ahmet Kemal Ozdemir, Cambridge (GB); Bent Andreas Kjellesvig, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 287 days.

(21) Appl. No.: 18/341,230

(22) Filed: Jun. 26, 2023

(65) Prior Publication Data

US 2023/0333272 A1    Oct. 19, 2023

Related U.S. Application Data

(62) Division of application No. 16/773,224, filed on Jan. 27, 2020, now Pat. No. 11,733,417, which is a division of application No. 15/117,220, filed as application No. PCT/US2015/015231 on Feb. 10, 2015, now Pat. No. 10,578,759.

(60) Provisional application No. 61/937,770, filed on Feb. 10, 2014.

(51) Int. Cl.
*G01V 1/36* (2006.01)
*G01V 1/38* (2006.01)

(52) U.S. Cl.
CPC .............. *G01V 1/36* (2013.01); *G01V 1/38* (2013.01); *G01V 1/3808* (2013.01); *G01V 2200/14* (2013.01); *G01V 2210/56* (2013.01); *G01V 2210/57* (2013.01)

(58) Field of Classification Search
CPC ........... G01V 2200/14; G01V 2210/56; G01V 2210/57; G01V 1/36; G01V 1/38; G01V 1/3808
See application file for complete search history.

(56) References Cited

U.S. PATENT DOCUMENTS

| 4,270,180 A | 5/1981 | Charlton |
| 5,920,828 A * | 7/1999 | Norris .................. G01V 1/3808 702/14 |
| 6,535,818 B1 | 3/2003 | Baeten |

(Continued)

FOREIGN PATENT DOCUMENTS

GB    2312062 A    10/1997

OTHER PUBLICATIONS

International Search report and Written Opinion issued in the related PCT Application PCT/US2015/015231, dated May 15, 2015 (17 pages).

(Continued)

*Primary Examiner* — Krystine E Breier
(74) *Attorney, Agent, or Firm* — Jeffrey D. Frantz

(57) ABSTRACT

Various implementations directed to quality control and preconditioning of seismic data are provided. In one implementation, a method may include receiving particle motion data from particle motion sensors disposed on seismic streamers. The method may also include performing quality control (QC) processing on the particle motion data. The method may further include performing preconditioning processing on the QC-processed particle motion data. The method may additionally include attenuating noise in the preconditioning-processed particle motion data.

20 Claims, 6 Drawing Sheets

(56) References Cited

U.S. PATENT DOCUMENTS

| | | | |
|---|---|---|---|
| 8,136,383 B2* | 3/2012 | Goujon | G01V 13/00 |
| | | | 73/1.38 |
| 8,639,442 B2* | 1/2014 | Ozdemir | G01V 1/36 |
| | | | 702/14 |
| 8,773,949 B2 | 7/2014 | Martin et al. | |
| 9,052,412 B2* | 6/2015 | Ozdemir | G01V 1/3817 |
| 9,217,805 B2* | 12/2015 | Welker | G01V 1/3808 |
| 9,250,340 B2* | 2/2016 | Brittan | G01V 1/36 |
| 10,031,247 B2* | 7/2018 | Ozdemir | G01V 1/36 |
| 10,578,759 B2 | 3/2020 | Ozdemir et al. | |
| 2002/0072856 A1 | 6/2002 | Jones et al. | |
| 2003/0182064 A1* | 9/2003 | Laake | G01V 1/36 |
| | | | 702/14 |
| 2004/0022125 A1 | 2/2004 | Clayton et al. | |
| 2004/0054479 A1 | 3/2004 | Trickett | |
| 2008/0159074 A1 | 7/2008 | Guis | |
| 2011/0182142 A1 | 7/2011 | Liu et al. | |
| 2012/0082001 A1* | 4/2012 | Welker | G01V 1/3808 |
| | | | 367/24 |
| 2014/0241124 A1 | 8/2014 | Bloor | |
| 2014/0288841 A1 | 9/2014 | Ozdemir | |

OTHER PUBLICATIONS

International Preliminary Report on Patentability issued in the related PCT Application PCT/US2015/015231, dated Aug. 25, 2016 (13 pages).
Parial Supplementary EP Seach Report received in the related EP Application 15746620.2, dated Aug. 23, 2017 (14 pages).
EP Extended Search Report received in the related EP Application 15746620.2, dated Dec. 13, 2017 (12 pages).

\* cited by examiner

QUALITY CONTROL AND PRECONDITIONING OF SEISMIC DATA

CROSS-REFERENCE TO RELATED APPLICATIONS

This application is a divisional application of U.S. patent application Ser. No. 16/773,224, filed Jan. 27, 2020, which is a divisional application of U.S. patent application Ser. No. 15/117,220, filed Aug. 8, 2016, which is a National Stage Entry of International Application No. PCT/US2015/015231, filed Feb. 10, 2015, which claims the benefit of U.S. Provisional Patent Application No. 61/937,770, filed Feb. 10, 2014. Each of the above applications is incorporated herein by reference in its entirety.

BACKGROUND

In a seismic survey, a plurality of seismic sources, such as explosives, vibrators, air guns, and/or the like, may be sequentially activated near the surface of the earth or in a wellbore to generate energy (i.e., seismic waves) which may propagate into and through the earth. The seismic waves may be reflected back by geological formations within the earth, and the resultant seismic wavefield may be sampled by a plurality of seismic receivers, such as geophones, hydrophones, and/or the like. Each receiver may be configured to acquire seismic data at the receiver's location, normally in the form of a seismogram representing the value of some characteristic of the seismic wavefield against time. The acquired seismograms or seismic data may be transmitted wirelessly or over electrical or optical cables to a recorder system. The recorder system may then store, analyze, and/or transmit the seismic data. This data may be used to generate an image of subsurface formations in the earth and may also be used to detect the possible presence of hydrocarbons, changes in the subsurface formations and the like.

Some surveys may be known as "marine" surveys, because they are conducted in marine environments. However, in some scenarios, "marine" surveys may be conducted not only in saltwater environments, but also in fresh and brackish waters. In one type of marine survey, called a "towed-array" survey, an array of seismic sensor-containing streamers and sources may be towed behind a survey vessel.

SUMMARY

Various implementations directed to quality control and preconditioning of seismic data are provided. In one implementation, a method may include receiving particle motion data from particle motion sensors disposed on seismic streamers. The method may also include performing quality control (QC) processing on the particle motion data. The method may further include performing preconditioning processing on the QC-processed particle motion data. The method may additionally include attenuating noise in the preconditioning-processed particle motion data.

In another implementation, a method may include receiving pressure data from pressure sensors disposed on seismic streamers. The method may further include performing quality control (QC) processing on the pressure data. The method may also include performing preconditioning processing on the QC-processed pressure data. The method may additionally include attenuating noise in the preconditioning-processed pressure data.

In yet another implementation, a method may include receiving particle motion data from particle motion sensors and pressure data from pressure sensors disposed on seismic streamers. The method may also include performing a first quality control (QC) processing on the particle motion data and a second QC processing on the pressure data. The method may further include performing a first preconditioning processing on the QC-processed particle motion data and a second preconditioning processing on the QC-processed pressure data. The method may additionally include attenuating noise in the preconditioning-processed particle motion data, and attenuating noise in the preconditioning-processed pressure data.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

DETAILED DESCRIPTION

Figure 1:
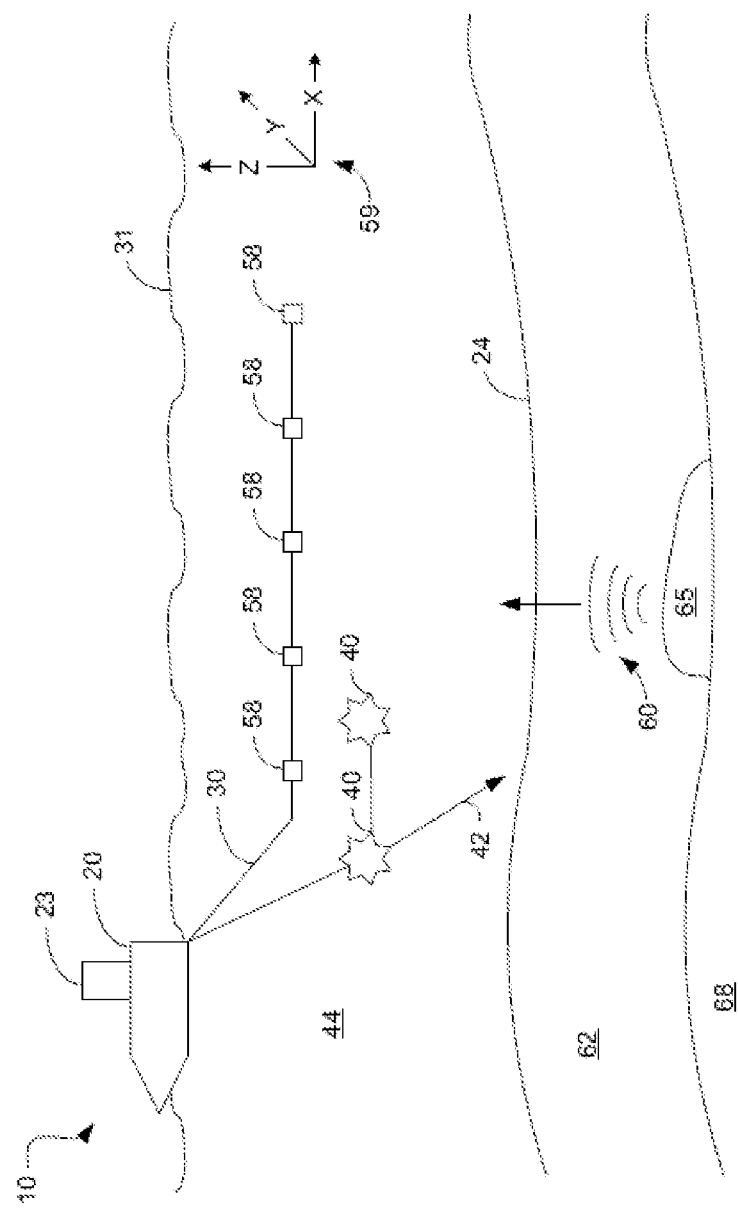
FIG. 1 illustrates a schematic diagram of a marine-based seismic acquisition system in accordance with implementations of various techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for quality control and preconditioning of seismic data will now be described in more detail with reference to FIGS. 1-6 in the following paragraphs.

Seismic Data Acquisition

FIG. 1 illustrates a schematic diagram of a marine-based seismic acquisition system 10 in accordance with implementations of various techniques described herein. In system 10, survey vessel 20 tows a plurality of seismic streamers 30 (one streamer 30 being depicted in FIG. 1) behind the vessel 20. In one implementation, streamers 30 may be arranged in a spread in which multiple streamers 30 are towed in approximately the same plane at the same depth. Although various techniques are described herein with reference to a marine-based seismic acquisition system shown in FIG. 1, it should be understood that other marine-based seismic acquisition system configurations may also be used. For instance, the streamers may be towed at multiple planes and/or multiple depths, such as in an over/under configuration. In one implementation, the streamers may be towed in a slanted configuration, where fronts of the streamers are towed shallower than tail ends of the streamers.

Seismic streamers 30 may be several thousand meters long and may contain various support cables, as well as wiring and/or circuitry that may be used to facilitate communication along the streamers 30. Each streamer 30 may also be composed of multiple sections connected to one another. In addition, each streamer 30 may have a solid core, liquid core, gel core, or any other implementation known to those skilled in the art.

Each streamer 30 may include a primary cable where seismic sensor units 58 that record seismic signals may be mounted. The seismic sensor units 58 may be connected along the streamer 30 at various spacing. For example, the seismic sensor units 58 may be spaced in an interleaved manner along an inline direction of a streamer 30.

Further, the seismic sensor units 58 may be arranged along an outer portion of the core and in a radial direction away from a central axis (not pictured) of the streamer 30. In another implementation, the sensors of each seismic sensor units 58 (e.g., pressure sensors, particle motion sensors, as further described below) may be positioned relative to one another such that they form an angle of ninety degrees with respect to the central axis.

In one implementation, each seismic sensor unit 58 may include one or more pressure sensors capable of detecting a pressure wavefield (i.e., acquiring pressure data). Such pressure sensors may include one or more hydrophones and/or any other implementation known to those skilled in the art. For example, each seismic sensor unit 58 may include a single hydrophone to acquire pressure data. In another example, each seismic sensor unit 58 may include two hydrophones to acquire pressure data. In another implementation, the pressure sensors may be spaced apart from one another such that the pressure sensors may detect particle acceleration by way of measuring a travel time and direction of a pressure wave.

In another implementation, each seismic sensor unit 58 may include one or more particle motion sensors capable of detecting at least one component of a particle motion that is associated with acoustic signals proximate to the sensor unit 58 (i.e. acquiring particle motion data). Examples of particle motions may include one or more components of a particle displacement, one or more components (i.e., inline (x), crossline (y) and vertical (z) components (see axes 59)) of a particle velocity, and one or more components of a particle acceleration.

In particular, a seismic sensor unit 58 may include at least one particle motion sensor for purposes of measuring a component of particle motion along a particular sensitive axis 59 (e.g., the x, y, or z axis). For example, the seismic sensor unit 58 may include a particle motion sensor that is oriented to acquire a measurement of a particle velocity along the vertical, or z, axis; a particle motion sensor to sense a particle velocity along the crossline, or y, axis; a particle motion sensor to sense a velocity along the inline, or x, axis; or combinations thereof, such as multiple particle motion sensors to sense particle velocities along the three (x, y, and z) axes. In another implementation, the particle motion sensor may be an accelerometer configured to measure one or more components of a particle acceleration. In a further implementation, the particle motion sensor may be a microelectromechanical systems (MEMS) accelerometer. For example, the particle motion sensor may be three-component MEMS accelerometers configured to acquire a measurement of a particle acceleration along the vertical (z-axis), crossline (y-axis), and inline (x-axis) directions. In another example, the particle motion sensor may be two-component MEMS accelerometers configured to acquire a measurement of a particle acceleration along the vertical (z-axis) and crossline (y-axis) directions.

In yet another implementation, the seismic sensor units 58 may be in the form of multi-component sensors, such that each seismic sensor unit 58 is capable of detecting both a pressure wavefield and at least one component of a particle motion that is associated with acoustic signals that are proximate to the sensor, such as the components described above. In such an implementation, each seismic sensor unit 58 may include both one or more pressure sensors and one or more particle motion sensors, such as those described above. In particular, depending on the particular survey, the multi-component seismic sensor unit 58 may include one or more hydrophones, geophones, particle displacement sensors, particle velocity sensors, accelerometers, pressure gradient sensors, or combinations thereof. In one implementation, the multi-component seismic sensor unit 58 may be implemented as a single device, as depicted in FIG. 1, or may be implemented as a plurality of devices.

Marine-based seismic data acquisition system 10 may also include one or more seismic sources 40, such as air guns and/or the like. In one implementation, seismic sources 40 may be coupled to, or towed by, the survey vessel 20. In another implementation, seismic sources 40 may operate independently of the survey vessel 20 in that the sources 40 may be coupled to other vessels or buoys.

A particular seismic source 40 may be part of an array of seismic source elements (such as air guns, for example) that may be arranged in strings (gun strings, for example) of the array. Regardless of the particular composition of the seismic sources, the sources may be fired in a particular time sequence during the survey.

As seismic streamers 30 are towed behind the survey vessel 20, acoustic signals 42, which may be referred to as "shots," may be produced by seismic sources 40 and are directed down through a water column 44 into strata 62 and 68 beneath a water bottom surface 24. Acoustic signals 42 may be reflected from the various subterranean geological formations, such as formation 65 depicted in FIG. 1.

The incident acoustic signals 42 that are generated by the sources 40 may produce corresponding reflected acoustic signals, or pressure waves 60, which may be sensed by seismic sensor units 58. In one implementation, pressure waves received and sensed by seismic sensor units 58 may include "up going" pressure waves that propagate to the sensor units 58 without reflection, as well as "down going" pressure waves that are produced by reflections of the pressure waves 60 from air-water boundary 31.

Seismic sensor units 58 may generate signals, called "traces," which indicate the acquired measurements of the pressure wavefield and/or particle motion. The traces (i.e., seismic data) may be recorded and may be processed by signal processing unit 23 deployed on the survey vessel 20.

The seismic data may be used to build up an image of a survey area for purposes of identifying subterranean geological formations, such as the geological formation 65. Subsequent analysis of the image may reveal probable locations of hydrocarbon deposits in subterranean geological formations. Analysis of the image may also be used for other purposes, such as Carbon Capture and Sequestration (CCS), geotechnical applications, and the like. In one implementation, portions of the analysis of the image may be performed on the seismic survey vessel 20, such as by the signal processing unit 23.

Although FIG. 1 illustrates a marine-based seismic acquisition system, the marine-based seismic acquisition system is provided as an example of a seismic acquisition system that may correspond to the implementations described herein. However, it should be noted that the implementations described herein may also be performed on other seismic acquisition systems.

Seismic Data Processing

As described above, seismic data, such as pressure data and/or particle motion data, may be acquired using a marine-based seismic acquisition system. In some scenarios, increasing the number of seismic streamers employed in such acquisition systems may lead to an increase in seismic data, and thereby an increase in the accuracy of images constructed for a survey area. However, the number of seismic streamers employed in such acquisition systems may be limited. In particular, the number of streamers that can be towed by a survey vessel may be limited due to issues relating to drag, entanglement of streamers, power constraints of the survey vessel, and/or the like.

In such scenarios, interpolation of the seismic data may be used. In particular, the interpolation may be used to construct seismic data between seismic streamers, such as where streamers are not present in the seismic acquisition system. In such scenarios, however, the interpolation and a subsequent noise attenuation of the seismic data may be compromised due to the existence of noise in the seismic data. Such noise may arise due to the sensitivity of the seismic sensors used during acquisition. In other scenarios, the interpolation and subsequent noise attenuation of the seismic data may be compromised due to the seismic data having been acquired via bad sensors. In particular, data acquired via the bad sensors may get smeared during noise attenuation and may degrade the quality of the seismic data acquired via good sensors.

As further described below, in some implementations, a quality control (QC) process, a preconditioning process, and a noise attenuation process may be performed on the seismic data. Such processing may be used to account for noise in the seismic data, as well as seismic data that may have been acquired via bad sensors.

In particular, and as further described below, the quality control process may be used to identify bad traces of the acquired seismic data. The bad traces may be composed of seismic data obtained from one or more bad sensors, such as dead, weak, noisy, and/or spiky sensors. The quality control process may not be used to substantively change values of the bad traces, except for traces which include digital spikes, as further described below.

The preconditioning process may be used to perform one or more corrective actions on the QC processed seismic data, as further described below. Further, the noise attenuation process may be used to remove noise from the preconditioning processed seismic data, where the noise attenuated seismic data may be used for later seismic processing.

In a further implementation, the QC process, the preconditioning process, and the noise attenuation process may be performed in real time or substantially near real time. In particular, the processes may be performed for seismic data corresponding to a particular shot, such that the processes may be completed before seismic data corresponding to a subsequent shot is received.

As mentioned above, the seismic data may include particle motion data and pressure data. In one implementation, the multi-component seismic sensor unit used to acquire the particle motion data and the pressure data may be composed of two hydrophones (as described above) in combination with three-component or two-component accelerometers (as described above).

The QC process, the preconditioning process, and the noise attenuation process applied to the particle motion data may be different than those applied to the pressure data. Further, the processes for the particle motion data and the processes for the hydrophone data may be performed in parallel.

Particle Motion Data Processing

Figure 2:
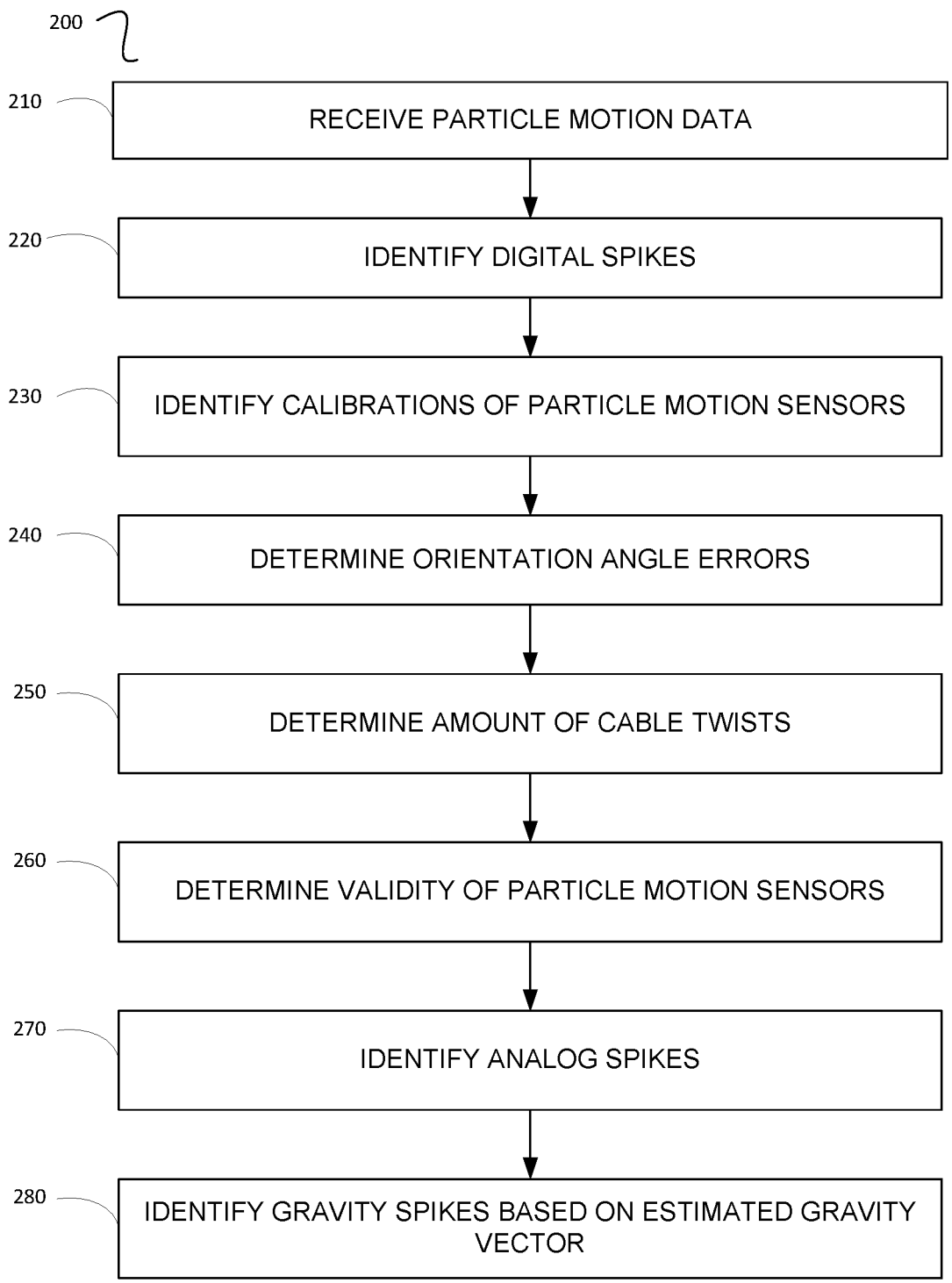
FIG. 2 illustrates a flow diagram of a method for performing a quality control (QC) process on particle motion data in accordance with implementations of various techniques described herein.

FIG. 2 illustrates a flow diagram of a method 200 for performing a QC process on particle motion data in accordance with implementations of various techniques described herein. In one implementation, method 200 may be performed by a computer application. It should be understood that while method 200 indicates a particular order of execution of operations, in some implementations, certain portions of the operations might be executed in a different order. Further, in some implementations, additional operations or blocks may be added to the method. Likewise, some operations or blocks may be omitted.

At block 210, particle motion data may be received. As mentioned above, the particle motion data may be received from a plurality of seismic sensor units disposed on a plurality of seismic streamers, where each of the seismic sensor units may include one or more particle motion sensors. In one implementation, each of the seismic sensor units may include three-component or two-component accelerometers (as described above). In another implementation, one group of accelerometer components may be separated from another group of accelerometer components along each streamer using 0.625 meter (m) spacing.

At block 220, one or more digital spikes in one or more traces of the particle motion data may be identified. A digital spike may be a spike which occurs in a trace after an in-sea anti-aliasing filter is applied to the trace. In another implementation, an amplitude based spike detection algorithm may be used to detect such digital spikes in the filtered traces. Other similar algorithms known to those skilled in the art may also be used.

For example, the algorithm may compute a mean or a median of the values of a trace of particle motion data. The algorithm may perform a difference operation on the values of the trace with the computed mean or median to identify values which differ from the mean or median by a threshold amount. Those values which differ beyond a threshold amount may be identified as digital spikes.

Upon identification, the digital spikes of a trace may be interpolated such that they may be removed from the trace. In another implementation, if the number of digital spikes in a trace exceeds a predetermined amount, or if the digital spikes occur in more than a predetermined amount of consecutive time samples for the trace, then the entire trace may be marked when stored. The trace and its associated particle motion sensor may be marked as bad due to the trace being spiky. Such a marking may allow a later seismic process to skip over the bad trace. In yet another implementation, the digital spikes of the trace may be related to a transmission error from the particle motion sensor.

At block 230, calibrations of one or more particle motion sensors may be determined. As mentioned above, the particle motion sensors may include the three-component accelerometers or any other implementation known to those skilled in the art.

In particular, the direct current (DC) offset values of the particle motion sensors may be used to compute the orientation of the particle motion sensors. The DC offset value may be the same as the amplitude of a signal having a frequency of 0 hertz (Hz). Any errors in the DC values may limit the ability to process the particle motion data, such as by rotating the data, as further described below. In some scenarios, low frequency noise due to rip currents or swell may interfere with the gravity measurements of the particle motion sensors.

In one implementation, the calibration of the particle motion sensors may be found by computing a median of the length of a gravity vector corresponding to the particle motion sensors. The median may then be compared against the standard gravity value of 9.81 m/(second (s))$^2$.

In particular, an expected value of a noisy gravity measurement may be estimated for a particle motion sensor by running a median filter on computed gravity values. The gravity measurement from each particle motion sensor may then be compared with the expected value of the noisy gravity measurement. The particle motion sensors having deviations greater than a threshold amount may be marked as uncalibrated. In particular, the particle motion sensor and/or its associated traces may be marked as bad due to the traces and/or sensor being uncalibrated. Such a marking may allow a later seismic process to skip over the bad traces.

At block 240, orientation angle errors of the particle motion sensors may be determined based on low frequency noise of the particle motion data. In one scenario, to acquire a high quality acceleration measurement from, for example, a three-component accelerometer, the sensor orientation angle of the three-component accelerometer should be measured with accuracy. In particular, in the presence of strong low frequency noise, a DC measurement using the accelerometer may be incorrect, and the accuracy of the computed orientation angle for the accelerometer may be compromised.

Accordingly, in one implementation, the amount of orientation angle errors may be determined based on low frequency noise amplitude. In a further implementation, to find the orientation angle errors, the low frequency noise amplitude may be estimated based on the particle motion data. The low frequency noise amplitude may be estimated from the particle motion data using any implementation known to those skilled in the art.

In one example, for low frequency (e.g., less than 5 Hz) noise amplitudes of particle acceleration data having values less than 85 decibels (dB), the orientation angle error for an accelerometer may be determined to be less than 2 degrees. Such an amount of orientation angle error may indicate accuracy in the orientation angle. Accordingly, the accelerometer and its associated data may be flagged or marked as accurate for use in later seismic processing.

In another example, for low frequency (e.g., less than 5 Hz) noise amplitudes of particle acceleration data having values between 85-95 dB, the orientation angle error for an accelerometer may be determined to be between 2-7 degrees. Such an amount of orientation angle error may be considered less than ideal, but acceptable. Accordingly, the accelerometer and its associated data may be flagged or marked as acceptable for use in later seismic processing.

In another example, for low frequency (e.g., less than 5 Hz) noise amplitudes of particle acceleration data having values greater than 95 dB, the orientation angle error for an accelerometer may be determined to be greater than 7 degrees. Such an amount of orientation angle error may be considered to be unacceptable. Accordingly, the accelerometer and its associated data may be flagged or marked as unacceptable for use in later seismic processing.

At block 250, an amount of cable twists for each of the seismic streamers may be determined. A streamer towed behind a seismic vessel may experience twists along its length. The twist may be caused by the rotational imbalances, by active steering devices, or if some debris get trapped to the streamer. The twist may have no effect on the scalar pressure wavefield, and it may have no negative effect on the acquired particle motion data as long as the sensor orientation is accurately computed.

Monitoring the twist in the streamer may be used to ensure the mechanical health of the streamer. Although streamers can tolerate a large number of twists along their length, if the number of twists becomes excessive there could be physical damage to the streamer or the wires within the streamer.

In one implementation, the particle motion sensors, such as accelerometers, disposed on a streamer may be used to measure the number of twists in the streamer. In particular, the streamer may be divided into portions along its length, with each portion having a set of particle motion sensors. The orientation of each portion of the streamer is measured using its set of sensors over time and then compared. If the comparison indicates that the orientation of a portion has changed beyond a predetermined threshold, then a cable twist for that portion may have occurred. If the number of cable twists for the portions of the streamer exceeds a set number, then a notification may be sent to the vessel which indicates that the streamer has exceeded the set number of cable twists.

At block 260, a validity of the one or more of the particle motion sensors may be determined based on at least one power spectral density (PSD) threshold curve. A particle motion sensor may be invalid if it is considered to be dead, weak, or noisy. A dead sensor may be a sensor which does not transmit data. A weak sensor may be a sensor which has lost sensitivity to signal. A noisy sensor may be a sensor with high self-noise (e.g., electronic noise) or environmental noise.

In one implementation, PSD may describe how the power of a signal may be distributed over frequency. In another implementation, the at least one PSD threshold curve may be generated based on any method known to those skilled in the art. For example, in one such implementation, as disclosed in commonly assigned U.S. Pat. No. 8,639,442, the entirety of which is herein incorporated by reference, the one or more particle motion sensors may be determined to be invalid based on upper and lower threshold curves.

In particular, in such an implementation, particle motion data may be received from a first particle motion sensor in a seismic survey. A PSD curve for the particle motion data may then be generated. In a further implementation, the PSD curve may be generated using predetermined frequency bands. A maximum PSD value of the PSD curve may then be generated. The above steps may be repeated for particle motion data received from other particle motion sensors in the survey. Further, an expected maximum PSD curve may be generated for each particle motion sensor using a smoothing filter. An upper and lower threshold curves may then be generated based on the expected maximum PSD curve. The maximum PSD value corresponding to each particle motion sensor may be compared to the upper and lower threshold curves to determine whether particle motion data acquired by each particle motion sensor is noisy or dead/weak. In a further implementation, if a maximum PSD value is greater than the upper threshold curve, then the particle motion sensor that corresponds to that maximum PSD value may be characterized as noisy. In addition, if a maximum PSD value is less than the lower threshold curve, then the particle motion data that corresponds to that maximum PSD value may be characterized as dead or weak.

In another implementation, the frequency band of 170-190 Hz may be used to detect particle motion sensors with high self noise, and the frequency band of 70-90 Hz may be used to detect particle motion sensors with high noise levels in the seismic frequency band.

After identifying the invalid particle motion sensors, the particle motion data that corresponds to the identified sensors may be muted, and new particle motion data may be interpolated to replace the muted particle motion data. The new particle motion data may be interpolated based on the particle motion data acquired by valid particle motion sensors that are near or adjacent to the invalid particle motion sensors. In this manner, the invalid particle motion data in the particle motion data may be corrected.

At block 270, one or more analog spikes in one or more traces of the particle motion data may be identified. In one implementation, an analog spike may occur before the application of the in-sea anti-aliasing filter to the traces. In another implementation, an energy based spike detection algorithm may be used to detect such analog spikes in the traces, including such algorithms known to those skilled in the art.

The analog spike may affect large blocks of a trace, such that the analog spikes may be smeared across multiple blocks. Accordingly, the energy based spike detection algorithm may compute the energy of a trace in overlapping blocks. In a further implementation, the algorithm may compute a mean or a median of the values of each block of a trace of particle motion data. The algorithm may perform a difference operation on the values of the block with the computed mean or median to identify values which differ from the mean or median by a threshold amount. Those values which differ beyond a threshold amount may be identified as analog spikes. In another implementation, the analog spikes may be determined for each component (e.g., inline, crossline, vertical) of the particle motion data for the particle motion sensor.

Upon identification, the analog spikes of a trace may be interpolated such that they may be removed from the block. In another implementation, if the number of analog spikes in a trace exceeds a predetermined amount, then the entire trace may be marked when stored. The trace and its associated particle motion sensor may be marked as bad due to the trace and sensor being spiky. Such a marking may allow a later seismic process to skip over the bad trace. In another implementation, the crossline and vertical values of the particle motion data may be rotated prior to application of the algorithm to avoid variations in signal energy due to cable twist of the streamers.

At block 280, one or more analog spikes not identified at block 270 may be identified based on an estimated gravity vector for each particle motion sensor. As mentioned above, the particle motion sensors may include the three-component accelerometers or any other implementation known to those skilled in the art.

An energy based spike detection algorithm similar to that used at block 270 may detect spikes in the DC value of a particle motion sensor by checking whether the estimated gravity vector for the sensor deviates positively or negatively from the standard gravity value of 9.81 m/(second (s))$^2$. In a further implementation, the algorithm may continuously check for such deviations. The deviations may indicate the presence of analog spikes.

As similarly discussed above, the analog spikes may affect large blocks of a trace for a particle motion sensor, such that the analog spikes may be smeared across multiple blocks. Accordingly, the analog spikes of a trace may be located in overlapping blocks. The deviations discussed above may be used to create pointers for identifying the blocks containing the spikes.

Upon identification, the analog spikes of a trace may be interpolated such that they may be removed from the block. In another implementation, if the number of analog spikes in a trace exceeds a predetermined amount, then the entire trace may be marked when stored. The trace and its associated particle motion sensor may be marked as bad due to the trace and sensor being spiky. Such a marking may allow a later seismic process to skip over the bad trace.

After performing the QC process on the acquired particle motion data, as described above with respect to FIG. 2, the preconditioning process may be applied to the QC-processed particle motion data. In one implementation, the preconditioning process may be applied to the crossline data and the vertical data of the QC-processed particle motion data.

Figure 3:
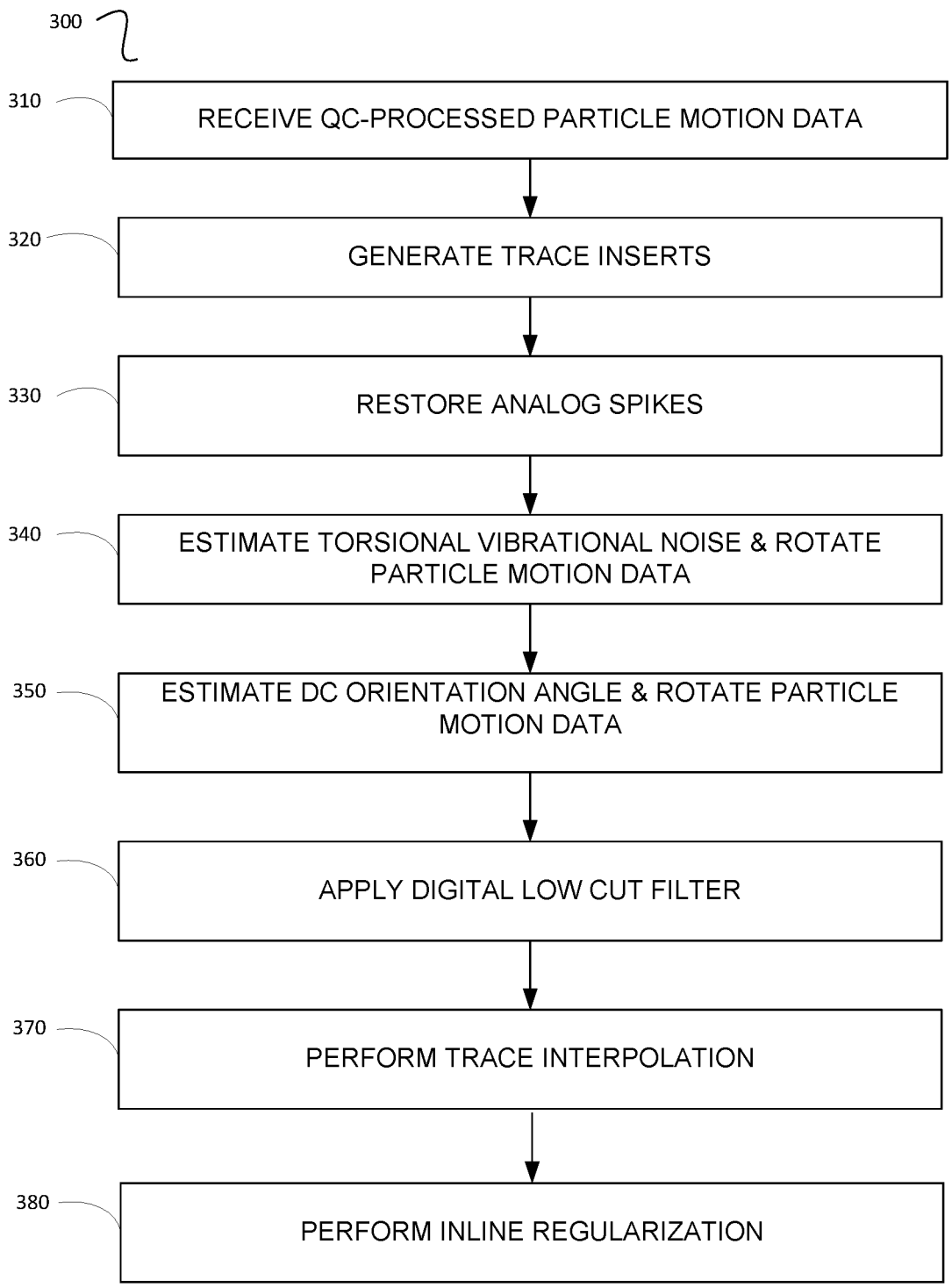
FIG. 3 illustrates a flow diagram of a method for performing a preconditioning process on QC-processed particle motion data in accordance with implementations of various techniques described herein.

FIG. 3 illustrates a flow diagram of a method 300 for performing a preconditioning process on QC-processed particle motion data in accordance with implementations of various techniques described herein. In one implementation, method 300 may be performed by a computer application. It should be understood that while method 300 indicates a particular order of execution of operations, in some implementations, certain portions of the operations might be executed in a different order. Further, in some implementations, additional operations or blocks may be added to the method. Likewise, some operations or blocks may be omitted.

At block 310, the QC-processed particle motion data may be received. As mentioned above, the crossline data and the vertical data of the QC-processed particle motion data may be received.

At block 320, one or more dummy traces can be generated to account for the inline gaps between consecutive sections due to connectors for the QC-processed particle motion data. In one implementation, the dummy traces may be generated for a shot record. A shot record may contain particle motion data from each particle motion sensor for one or more shots, with each sensor represented in the shot record by a trace.

In some implementations, the shot record may include one or more dummy traces to represent one or more inserts positioned between the sensors along the streamer. The inserts may include birds, fins, power supply, acoustic positioning devices and transmitter, and/or the like. The dummy traces may contain no data and may be used to account for the gaps in the streamers.

In one implementation, the generating of dummy traces, which we will refer to as trace inserts, may be used in the shot record in order to reduce an amount of irregularity. The amount of trace inserts needed may be proportional to the length of the inserts disposed in the streamer. Further, the trace inserts may be generated prior to a torsional vibration noise based rotation (as described below), as such a rotation may not be applied when there are gaps in the shot record. Once generated and inserted into the shot record for the gaps, these trace inserts may be marked as dead traces, and may be interpolated later during seismic processing.

At block 330, a restoration of one or more analog spikes may be performed on the QC-processed particle motion data. In one implementation, analog spikes previously marked or flagged as part of a trace or block of traces may be restored by performing interpolation on the analog spikes. In a further implementation, the restoration (i.e., interpolation) may be performed on spikes in a trace or block of traces if the number of spikes in the trace or block of traces is lower than a predetermined threshold. In contrast, if the number of spikes in the trace or block of traces is higher than the predetermined threshold, then the entire trace or block of traces may be interpolated. Other methods of performing a restoration of analog spikes known to those skilled in the art may be used.

At block 340, torsional vibrational noise in the particle motion data may be estimated, and the particle motion data may be rotated in order to adjust the particle motion data. As a seismic streamer is towed, the streamer may rotate, which can cause the particle motion sensors of the streamer to rotate away from a reference coordinate system. If the rotation of the streamer is not accounted for, the results obtained from processing the particle motion data may not be accurate.

In particular, using implementations known to those skilled in the art, torsional vibrational noise in the particle motion data may be estimated, and the particle motion data may be rotated in order to adjust the particle motion data based on the torsional vibrational noise.

In one implementation, methods and systems disclosed in commonly assigned U.S. patent application Ser. No. 13/194, 512 entitled DETERMINING AN ORIENTATION ANGLE OF A SURVEY SENSOR, incorporated herein by reference in its entirety, may be used. In such an implementation, a first orientation angle component of the orientation angle may be determined, based on estimating torsional vibrational noise in the particle motion data. Further, a first orientation angle component of an orientation angle relating to angular rotation of a particle motion sensor with respect to a reference coordinate system may be determined. The first orientation angle component may vary at a higher rate than a second orientation angle component (i.e., a DC orientation angle, as further described below). The orientation angle may be provided by aggregating the first and second orientation angle components. The particle motion data may then be corrected by rotating the particle motion data based on the orientation angle.

At block 350, DC orientation angle in the particle motion data may be estimated, and the particle motion data may be rotated in order to adjust the particle motion data based on the DC orientation angle. In one implementation, the particle motion sensors may measure both the cosine and the sine of an orientation angle and an angular acceleration. These two different quantities may allow for measurement of dynamical orientation angle changes with frequency content up to about 20 Hz. An algorithm may compute the dynamical orientation angle with frequency content having a range between about 0.25 Hz to about 20 Hz. The algorithm may initially separate the angular acceleration from the vibration noise and signal. The algorithm may then integrate the angular acceleration twice to get the estimate of the angle at frequencies above about 0.25 Hz. This component of the orientation angle may be referred to as the dynamical orientation angle. After computing the dynamical orientation angle, the particle motion data may rotated. The frequency content of the remaining component of the orientation angle may be 0-0.25 Hz. The partially rotated particle motion data may contain the sine and the cosine of this orientation angle with a frequency content 0-0.5 Hz. The algorithm may separate this low-frequency sine and the cosine measurement from other noise and signal terms. The arctangent of the computed sine and the cosine signals may provide the second component of the orientation angle. In another implementation, the DC orientation angle may be less than 1 Hz.

The total orientation angle may be obtained by summing the two components of the orientation angle. After the second rotation, the vertical data may be aligned with the vertical direction (pointing downwards), and the crossline data may be aligned with the crossline direction.

At block 360, a digital low cut filter may be applied to the QC-processed particle motion data. Any digital low cut filter known to those skilled in the art may be used. In one implementation, one or more third order Butterworth filters may be used, such as with 1.5 Hz and 3 Hz corner frequencies respectively. The filters may be applied in both forwards and reverse directions, thereby making the filters sixth order and avoiding phase distortion. Therefore, the effective roll-rate of the filters may be 36 dB/octave. The low frequencies of accelerometers may be discarded.

In another implementation, guard window tapering may be applied in conjunction with the filters to reduce filtering edge effects. The taper length of the guard window tapering may be chosen to be comparable to or less than the length of the impulse response of the digital low-cut filter.

At block 370, a trace interpolation may be performed on the QC-processed particle motion data. In one implementation, the trace interpolation may be performed on marked or flagged bad traces, such as those discussed above. Further, the trace interpolation may be performed on the trace inserts discussed above. Any trace interpolation process known to those skilled in the art may be used.

At block 380, an inline regularization may be performed on the interpolated particle motion data. Due to the inserts (e.g., birds, fins, etc.) mentioned above and other components (e.g., connectors) disposed on the seismic streamers, the spacing between the last particle motion sensor of one section of a shot record and the first particle motion sensor of the next section of the shot record of the particle motion data may not correspond to the actual particle motion sensor spacing. Any inline regularization method known to those skilled in the art may be used to regularize the spacing of the traces of the particle motion data.

After performing the preconditioning process on the QC-processed particle motion data, a noise attenuation may be performed on the inline regularized particle motion data. Any noise attenuation method known to those skilled in the art may be used. In one implementation, methods and systems disclosed in commonly assigned U.S. Pat. No. 8,773,949 entitled REMOVING NOISE FROM A SEISMIC MEASUREMENT, incorporated herein by reference in its entirety, may be used. For example, the noise attenuation may be a multi-scale noise attenuation.

The noise attenuated particle motion data may, along with noise attenuated pressure data (as described below), include a crossline component and a vertical component, where the traces of the data may be uniformly spaced. Such data may be used to build up an image of a survey area for purposes of identifying subterranean geological formations, such as the geological formation. Subsequent analysis of the image may reveal probable locations of hydrocarbon deposits in subterranean geological formations.

Pressure Data Processing

Figure 4:
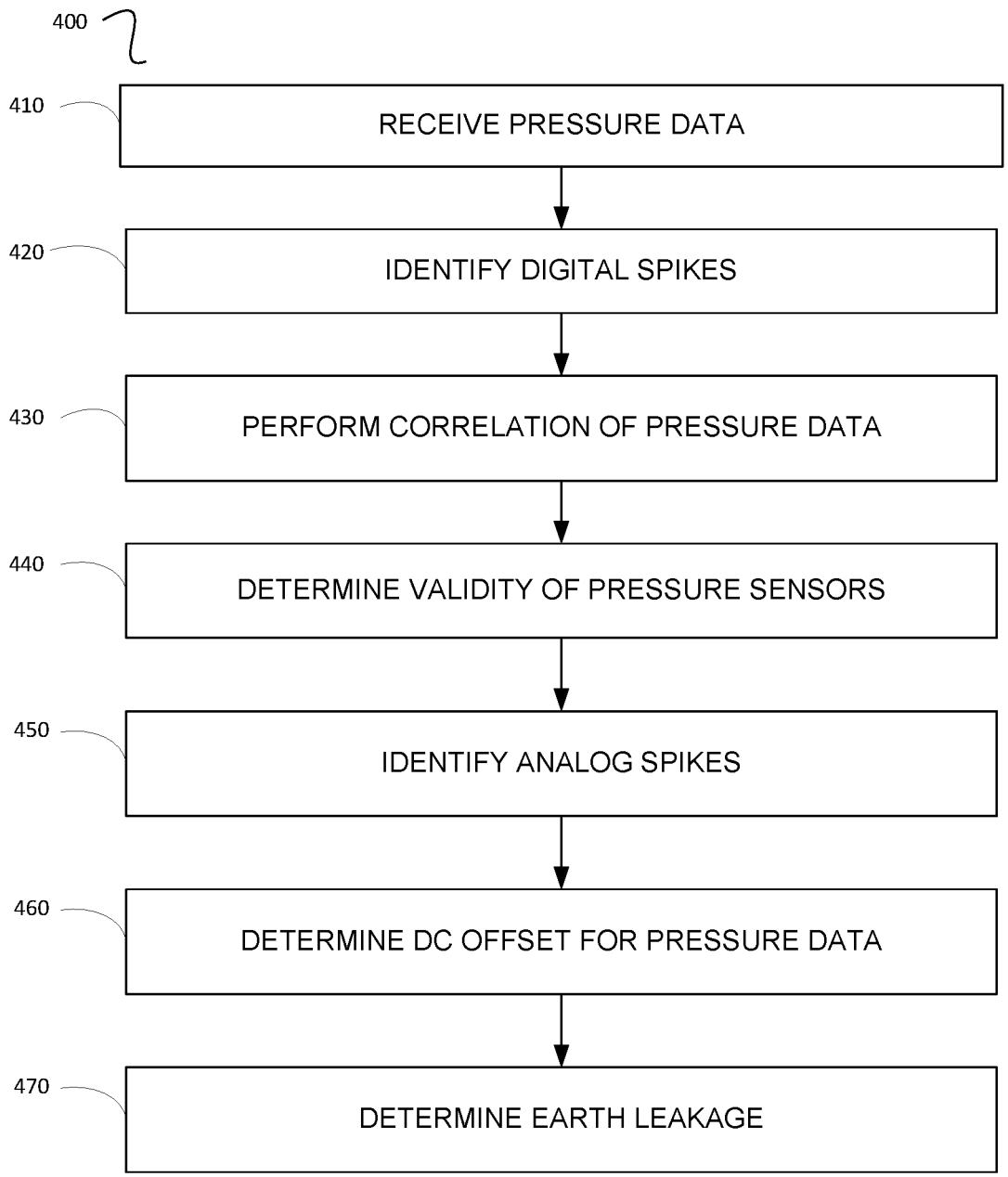
FIG. 4 illustrates a flow diagram of a method for performing a QC process on pressure data in accordance with implementations of various techniques described herein.

FIG. 4 illustrates a flow diagram of a method 400 for performing a QC process on pressure data in accordance with implementations of various techniques described herein. In one implementation, method 400 may be performed by a computer application. It should be understood that while method 400 indicates a particular order of execution of operations, in some implementations, certain portions of the operations might be executed in a different order. Further, in some implementations, additional operations or blocks may be added to the method. Likewise, some operations or blocks may be omitted.

At block 410, pressure data may be received. As mentioned above, the pressure data may be received from a plurality of seismic sensor units disposed on a plurality of seismic streamers, where each of the seismic sensor units may include one or more pressure sensors. In one implementation, the seismic sensor units may each include two hydrophones (as described above). In another implementation, the hydrophone pairs may be separated from other hydrophone pairs along a streamer using 3.125 m spacing.

At block 420, one or more digital spikes in one or more traces of the pressure data may be identified. The digital spikes may be similar to those discussed above with respect to FIG. 2. Further, a similar amplitude based spike detection algorithm discussed with respect to FIG. 2 may be used to detect such digital spikes.

Upon identification, the digital spikes of a trace may be interpolated such that they may be removed from the trace. In another implementation, if the number of digital spikes in a trace exceeds a predetermined amount, or if the digital spikes occur in more than a predetermined amount of consecutive time samples for the trace, then the entire trace may be marked when stored. The trace and its associated pressure sensor may be marked as bad due to the trace and sensor being spiky. Such a marking may allow a later seismic process to skip over the bad trace. In yet another implementation, the digital spikes of the trace may be related to a transmission error from the pressure sensor.

At block 430, a correlation of the pressure data may be performed. In particular, a cross correlation coefficient may be calculated for the individual hydrophones of each hydrophone pair. Any implementation known in the art for calculating the cross correlation coefficient may be used. In one implementation, the coefficient of the pressure data received from each individual hydrophone of the hydrophone pair may be computed. If the coefficient indicates that the pressure data received from each hydrophone are different, then one of the individual hydrophones of the pair may be corrupted.

In one implementation, the coefficient may range in value between a −1 to a +1. For instance, if one of the individual hydrophones has incorrect polarity, then the correlation coefficient may be equal to a −1 value. In another example, if one of the individual hydrophones differs from the other by an amount between −1 and +1, then one of the individual hydrophones may measure pressure data differently.

At block 440, a validity of one or more of the pressure sensors may be determined based on at least one PSD threshold curve.

For pressure sensors, the at least one PSD threshold curve may use spectra with two different parameter sets. The first set of parameters may be used to identify noisy traces at 5-30 Hz and may be compatible with a root mean square (RMS) technique for finding invalid pressure sensors. The second set of parameters may be used to identify weak traces and their corresponding weak pressure sensors which have lost sensitivity to signal on an automatically computed signal window. The process for determining the validity of the pressure sensors based on a PSD threshold curve may be performed on summed hydrophones as well as to identify collocated pressure sensors that have opposite polarity.

Further, as similar discussed above with respect to FIG. 2, comparing the metrics for different pressure sensors using PSD threshold curves may be used to identify the outliers. For instance, pressure sensors with very high amplitude spectrum may be labeled as noisy, and pressure sensors with very low amplitude spectrum may be labeled as weak (small value) or dead (zero value).

In some implementation, the determination of validity may be performed three times for the pressure sensors. During the first run, the validity of single hydrophones (before summation) may be determined on an automatically selected signal window to estimate the relative sensitivity of each pressure sensor. During the second run, a temporary sensitivity correction may be applied based on the result of the first run. After the second run, a temporary hydrophone summation may be performed. During the third run, a validity of summed hydrophones (after sensitivity correction) may be determined on an automatically selected signal window to identify additional noisy and weak sensors. Weak sensors after summation that are identified by the third PSD QC are likely to be caused by polarity errors.

After identifying the invalid pressure sensors, the pressure data that corresponds to the identified sensors may be muted, and new pressure data may be interpolated to replace the muted pressure data. The new pressure data may be interpolated based on the pressure data acquired by valid pressure sensors that are near or adjacent to the invalid pressure sensors. In this manner, the invalid pressure data in the particle motion data may be corrected.

At block 450, one or more analog spikes in one or more traces of the pressure data may be identified. The analog spikes may be similar to the analog spikes discussed above with respect to FIG. 2. Further, an algorithm similar to that discussed above with respect to FIG. 2 may be used to detect the analog spikes in the pressure data.

Upon identification, the analog spikes of a trace may be interpolated such that they may be removed from the block. In another implementation, if the number of analog spikes in a trace exceeds a predetermined amount, then the entire trace may be marked when stored. The trace and its associated pressure sensor may be marked as bad due to the trace and sensor being spiky. Such a marking may allow a later seismic process to skip over the bad trace.

At block 460, a DC offset for each trace of the pressure data may be determined. Traces of pressure data with relatively large DC offsets may measure as a distorted signal. Accordingly, an algorithm may be used to identify and flag traces of the pressure data having a DC offset larger than a threshold amount. Such flagged or marked traces may be muted and interpolated during later processing. Any algorithm known to those skilled in the art may be used.

At block 470, earth leakage for the pressure data may be determined. In one implementation, earth leakage may occur in the event of a short circuit in a streamer. In such an event, then the DC offsets of the pressure sensors of the streamer may change suddenly during a period of time with the earth leakage. The change in DC offsets may have an impact on the pressure data.

An algorithm may be used which detects the earth leakage and provides a notification to the survey vessel of the existence of the earth leakage. In one implementation, the algorithm may measure the DC offsets of each pressure sensor in a streamer over time. In the event of a sudden change in the DC offsets, the previous offsets may be compared to the new offsets. Based on the comparison, an earth leakage may be detected and a notification may be sent to the survey vessel. In another implementation, the earth leakage may be detected using a computed smash-stack of traces of the pressure data, or any other implementation known to those skilled in the art.

After performing the QC process on the acquired pressure data, as described above with respect to FIG. 2, a preconditioning process may be applied to the QC-processed pressure data.

Figure 5:
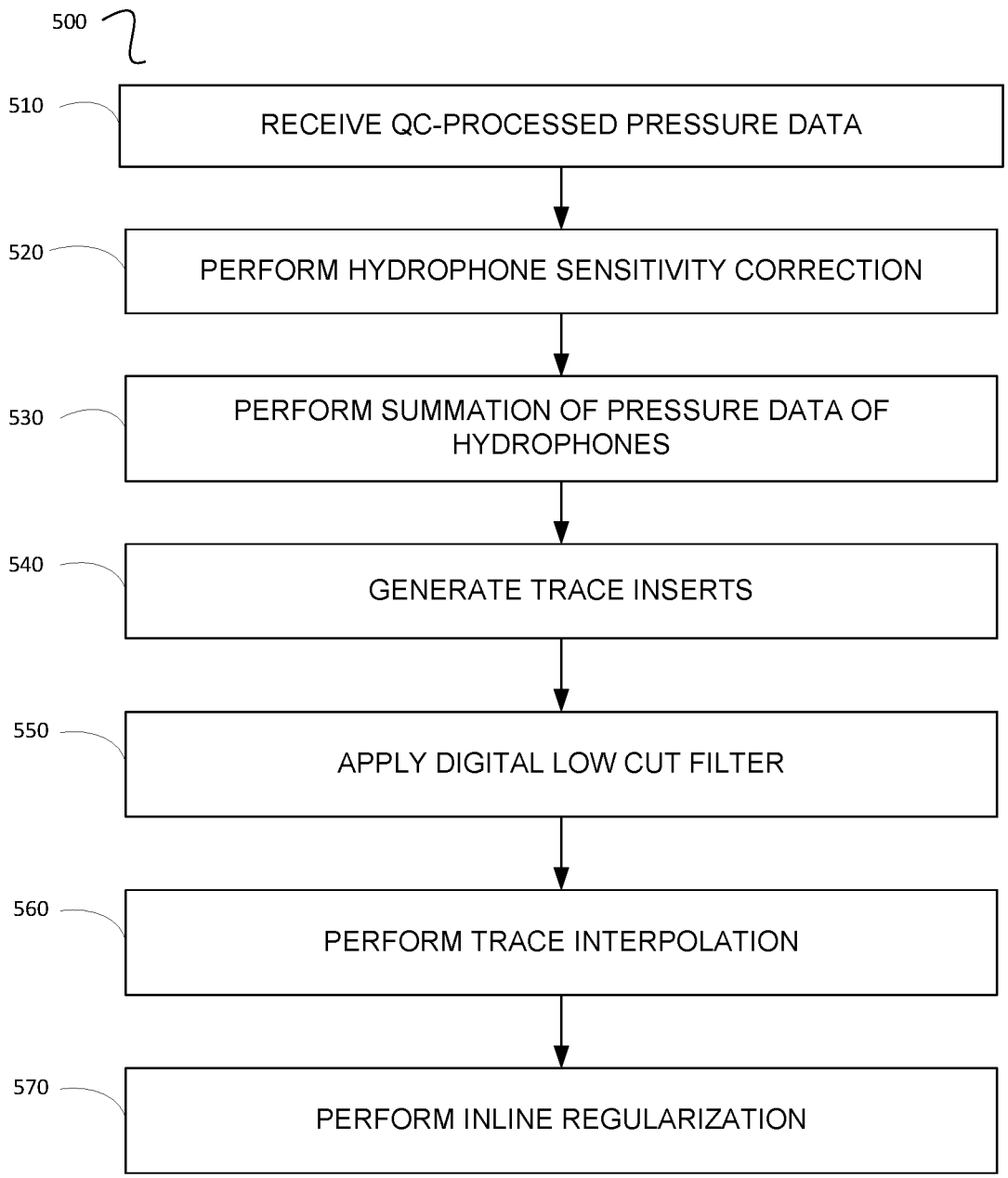
FIG. 5 illustrates a flow diagram of a method for performing a preconditioning process on QC-processed pressure data in accordance with implementations of various techniques described herein.

FIG. 5 illustrates a flow diagram of a method 500 for performing a preconditioning process on QC-processed pressure data in accordance with implementations of various techniques described herein. In one implementation, method 500 may be performed by a computer application. It should be understood that while method 500 indicates a particular order of execution of operations, in some implementations, certain portions of the operations might be executed in a different order. Further, in some implementations, additional operations or blocks may be added to the method. Likewise, some operations or blocks may be omitted.

At block 510, the QC-processed pressure data may be received. In one implementation, pressure data from each individual hydrophone of a hydrophone pair may be received.

At block 520, as mentioned above with respect to FIG. 4, a sensitivity correction of the hydrophones may be performed. In particular, weak hydrophones may have scalar correction factors applied to their weak pressure data. After application of the scalar correction factors, the pressure data may fall within a predetermined threshold such that it is no longer considered weak.

At block 530, pressure data from individual hydrophones of a hydrophone pair may be summed. In one implementation, given that the individual hydrophones may be mounted at opposite sides of a central axis of a streamer, the respective pressure data received at the individual hydrophones may have the same polarity. Further, given such positioning, the respective transversal vibration noise of the pressure data received at the individual hydrophones may have an opposite polarity.

Accordingly, by summing their respective pressure data, transversal vibration noise received by the individual hydrophones may be attenuated. After hydrophone summation, the number of hydrophones in a streamer may be halved. After summing the pressure data, the data may be divided by two to find the average. In another implementation, if one of the individual hydrophones is flagged as a bad sensor, then the other individual hydrophone may be used without performing the summation.

At block 540, one or more trace inserts may be generated for the QC-processed pressure data. The trace inserts may be generated as similarly discussed above with respect to FIG. 3.

At block 550, a digital low cut filter may be applied to the QC-processed pressure data. The digital low cut filter may be applied as similarly discussed above with respect to FIG. 3. In another implementation, guard window tapering may be applied in conjunction with the filters to reduce filtering edge effects. The taper length of the guard window tapering may be chosen to be comparable to or less than the length of the impulse response of the digital low-cut filter.

At block 560, a trace interpolation may be performed on the QC-processed pressure data. In one implementation, the trace interpolation may be performed on marked or flagged bad traces, such as those discussed above. Further, the trace interpolation may be performed on the trace inserts discussed above. Any trace interpolation process known to those skilled in the art may be used.

At block 570, an inline regularization may be performed on the interpolated pressure data. Due to the inserts (e.g., birds, fins, etc.) mentioned above and other components (e.g., connectors) disposed on the seismic streamers, the spacing between the last pressure sensor of one section of a shot record and the first pressure sensor of the next section of the shot record of the pressure data may not correspond to the actual pressure sensor spacing. Any inline regularization method known to those skilled in the art may be used to regularize the spacing of the traces of the pressure data.

After performing the preconditioning process on the QC-processed pressure, a noise attenuation may be performed on the inline regularized particle motion data. Any noise attenuation method known to those skilled in the art may be used, as similarly discussed above with respect to particle motion data. The noise attenuation pressure data may be used to build up an image of a survey area for purposes of identifying subterranean geological formations, such as the geological formation. Subsequent analysis of the image may reveal probable locations of hydrocarbon deposits in subterranean geological formations.

Computing Systems

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 6:
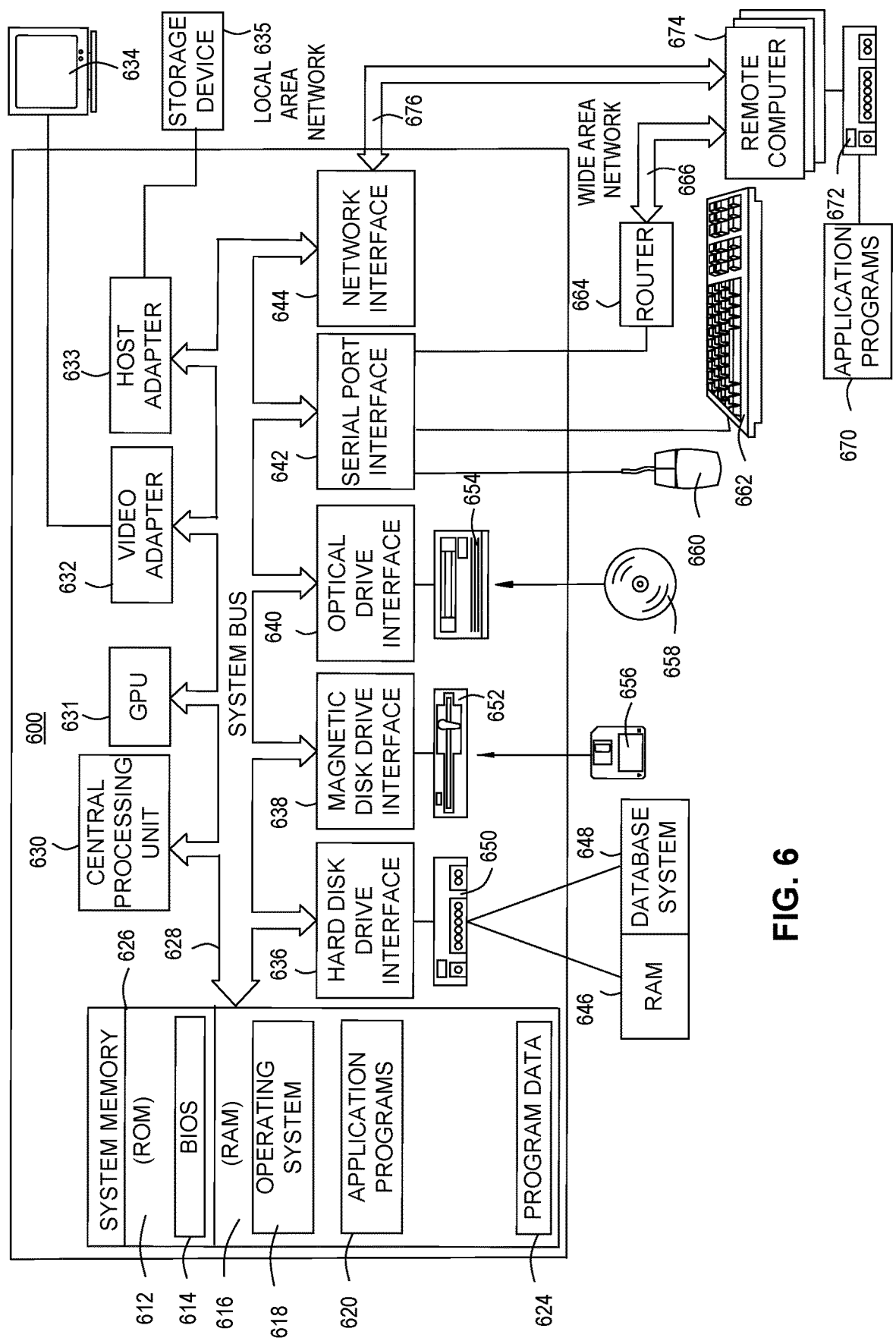
FIG. 6 illustrates a schematic diagram of a computing system in which the various technologies described herein may be incorporated and practiced.

FIG. 6 illustrates a schematic diagram of a computing system 600 in which the various technologies described herein may be incorporated and practiced. Although the computing system 600 may be a conventional desktop or a server computer, as described above, other computer system configurations may be used.

The computing system 600 may include a central processing unit (CPU) 630, a system memory 626, a graphics processing unit (GPU) 631 and a system bus 628 that couples various system components including the system memory 626 to the CPU 630. Although one CPU is illustrated in FIG. 6, it should be understood that in some implementations the computing system 600 may include more than one CPU. The GPU 631 may be a microprocessor specifically designed to manipulate and implement computer graphics. The CPU 630 may offload work to the GPU 631. The GPU 631 may have its own graphics memory, and/or may have access to a portion of the system memory 626. As with the CPU 630, the GPU 631 may include one or more processing units, and the processing units may include one or more cores. The system bus 628 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 626 may include a read-only memory (ROM) 612 and a random access memory (RAM) 646. A basic input/output system (BIOS) 614, containing the basic routines that help transfer information between elements within the computing system 600, such as during start-up, may be stored in the ROM 612.

The computing system 600 may further include a hard disk drive 650 for reading from and writing to a hard disk, a magnetic disk drive 652 for reading from and writing to a removable magnetic disk 656, and an optical disk drive 654 for reading from and writing to a removable optical disk 658, such as a CD ROM or other optical media. The hard disk drive 650, the magnetic disk drive 652, and the optical disk drive 654 may be connected to the system bus 628 by a hard disk drive interface 636, a magnetic disk drive interface 638, and an optical drive interface 640, respectively. The drives and their associated computer-readable media may provide nonvolatile storage of computer-readable instructions, data structures, program modules and other data for the computing system 600.

Although the computing system 600 is described herein as having a hard disk, a removable magnetic disk 656 and a removable optical disk 658, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 600 may also include a host adapter 633 that connects to a storage device 635 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 650, magnetic disk 656, optical disk 658, ROM 612 or RAM 616, including an operating system 618, one or more application programs 620, program data 624, and a database system 648. The application programs 620 may include various mobile applications ("apps") and other applications configured to perform various methods and techniques described herein. The operating system 618 may be any suitable operating system that may control the operation of a networked personal or server computer, such as Windows® XP, Mac OS® X, Unix-variants (e.g., Linux® and BSD®), and the like.

A user may enter commands and information into the computing system 600 through input devices such as a keyboard 662 and pointing device 660. Other input devices may include a microphone, joystick, game pad, satellite dish, scanner, or the like. These and other input devices may be connected to the CPU 630 through a serial port interface 642 coupled to system bus 628, but may be connected by other interfaces, such as a parallel port, game port or a universal serial bus (USB). A monitor 634 or other type of display device may also be connected to system bus 628 via an interface, such as a video adapter 632. In addition to the monitor 634, the computing system 600 may further include other peripheral output devices such as speakers and printers.

Further, the computing system 600 may operate in a networked environment using logical connections to one or more remote computers 674. The logical connections may be any connection that is commonplace in offices, enterprise-wide computer networks, intranets, and the Internet, such as local area network (LAN) 676 and a wide area network (WAN) 666. The remote computers 674 may be another a computer, a server computer, a router, a network PC, a peer device or other common network node, and may include many of the elements describes above relative to the computing system 600. The remote computers 674 may also each include application programs 670 similar to that of the computer action function.

When using a LAN networking environment, the computing system 600 may be connected to the local network 676 through a network interface or adapter 644. When used in a WAN networking environment, the computing system 600 may include a router 664, wireless router or other means for establishing communication over a wide area network 666, such as the Internet. The router 664, which may be internal or external, may be connected to the system bus 628 via the serial port interface 642. In a networked environment, program modules depicted relative to the computing system 600, or portions thereof, may be stored in a remote memory storage device 672. It will be appreciated that the network connections shown are merely examples and other means of establishing a communications link between the computers may be used.

The network interface 644 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 674.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 600 may be located at a data center remote from the survey region. The system computer 600 may be in communication with the receivers (either directly or via a recording unit, not shown), to receive signals indicative of the reflected seismic energy. These signals, after conventional formatting and other initial processing, may be stored by the system computer 600 as digital data in the disk storage for subsequent retrieval and processing in the manner described above. In one implementation, these signals and data may be sent to the system computer 600 directly from sensors, such as geophones, hydrophones and the like. When receiving data directly from the sensors, the system computer 600 may be described as part of an in-field data processing system. In another implementation, the system computer 600 may process seismic data already stored in the disk storage. When processing data stored in the disk storage, the system computer 600 may be described as part of a remote data processing center, separate from data acquisition. The system computer 600 may be configured to process data as part of the in-field data processing system, the remote data processing system or a combination thereof.

Those with skill in the art will appreciate that any of the listed architectures, features or standards discussed above with respect to the example computing system 600 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:
receiving particle motion data from a plurality of particle motion sensors and pressure data from a plurality of pressure sensors disposed on a plurality of seismic streamers;
performing a first quality control (QC) processing on the particle motion data to generate QC-processed particle motion data by:
determining a calibration of each of the plurality of particle motion sensors based on a plurality of gravity vectors corresponding to the plurality of particle motion sensors and a standard gravity vector;
identifying a first subset of the plurality of particle motion sensors based on the calibration, wherein the first subset of the plurality of particle motion sensors is characterized as being calibrated;
determining orientation angle errors of the first subset of the plurality of particle motion sensors based on low frequency noise of the particle motion data;
identifying a second subset of the plurality of particle motion sensors based on the first subset and the orientation angle errors of the first subset, wherein each particle motion sensor of the second subset has a respective orientation angle error that is less than a threshold value;
generating one or more first power spectral density curves for one or more particle motion sensors of the second subset of the plurality of particle motion sensors;
identifying a third subset of the plurality of particle motion sensors based on the one or more first power spectral density curves and a respective first power spectral density threshold curve associated with each of the one or more particle motion sensors; and
generating the QC-processed particle motion data based on a portion of the particle motion data corresponding to the third subset of the plurality of particle motion sensors;
performing a second QC processing on the pressure data to generate QC-processed pressure data by:
generating one or more second power spectral density curves for one or more pressure sensors of the plurality of pressure sensors;
identifying a subset of the plurality of pressure sensors based on the one or more second power spectral density curves and a respective second power spectral density threshold curve associated with each of the plurality of pressure sensors; and
generating the QC-processed pressure data based on a portion of the pressure data corresponding to the subset of the plurality of pressure sensors;
performing a first preconditioning processing on the QC-processed particle motion data to generate preconditioned QC-processed particle motion data and a second preconditioning processing on the QC-processed pressure data to generate preconditioned QC-processed pressure data;
attenuating noise in the preconditioned QC-processed particle motion data; and
attenuating noise in the preconditioned QC-processed pressure data.

2. The method of claim 1, wherein:
performing the first QC processing on the particle motion data to generate the QC-processed particle motion data comprises:
- identifying one or more digital spikes in the portion of the particle motion data;
- identifying one or more analog spikes in the portion of the particle motion data;
- removing the one or more digital spikes and the one or more analog spikes from the portion of the particle motion data to generate an additional portion of the particle motion data; and
- generating an additional QC-processed particle motion data based on the additional portion of the particle motion data.

3. The method of claim 1, wherein:
performing the first preconditioning processing on the QC-processed particle motion data comprises:
- generating one or more trace inserts for the QC-processed particle motion data to generate a first partially preconditioned QC-processed particle motion data;
- estimating one or more orientation angles of the QC-processed particle motion data;
- rotating the QC-processed particle motion data based on the one or more orientation angles to generate rotated QC-processed particle motion data;
- generating a second partially preconditioned QC-processed particle motion data based on the first partially preconditioned QC-processed particle motion data and the rotated QC-processed particle motion data;
- applying a digital low cut filter to the QC-processed particle motion data to generate filtered-QC-processed particle motion data;
- generating a third partially preconditioned QC-processed particle motion data based on the second partially preconditioned QC-processed particle motion data and the filtered-QC-processed particle motion data;
- interpolating one or more traces of the QC-processed particle motion data to generate one or more interpolated traces of the QC-processed particle motion data;
- generating a fourth partially preconditioned QC-processed particle motion data based on the third partially preconditioned QC-processed particle motion data and the one or more interpolated traces of the QC-processed particle motion data;
- performing an inline regularization on the one or more interpolated traces to generate one or more inline regularized interpolated traces;
- generating a fifth partially preconditioned QC-processed particle motion data based on the fourth partially preconditioned QC-processed particle motion data and the one or more inline regularized interpolated traces; or
- any combination thereof.

4. The method of claim 1, wherein performing the second QC processing on the pressure data to generate the QC-processed pressure data comprises:
- identifying one or more analog spikes in the portion of the pressure data;
- removing the one or more analog spikes from the portion of the pressure data to generate an additional portion of the pressure data; and
- generating an additional QC-processed pressure data based on the additional portion of the pressure data.

5. The method of claim 1, wherein performing the second preconditioning processing on the QC-processed pressure data comprises:
- generating one or more trace inserts for the QC-processed pressure data to generate a first partially preconditioned QC-processed pressure data;
- applying a digital low cut filter to the QC-processed pressure data to generate a filtered QC-processed pressure data;
- generating a second partially preconditioned QC-processed pressure data based on the first partially preconditioned QC-processed pressure data and the filtered QC-processed pressure data;
- interpolating one or more traces of the QC-processed pressure data to generate one or more interpolated traces of the QC-processed pressure data;
- generating a third partially preconditioned QC-processed pressure data based on the second partially preconditioned QC-processed pressure data and the one or more interpolated traces of the QC-processed pressure data;
- performing an inline regularization on the one or more interpolated traces of the QC-processed pressure data to generate inline regularized interpolated pressure data;
- generating a fourth partially preconditioned QC-processed pressure data based on the third partially preconditioned QC-processed pressure data and the inline regularized interpolated pressure data; or
- any combination thereof.

6. The method of claim 1, wherein the plurality of pressure sensors comprises one or more pairs of hydrophones.

7. The method of claim 6, wherein performing the second QC processing on the pressure data to generate the QC-processed pressure data comprises:
- calculating a cross-correlation coefficient for individual hydrophones of a respective pair of the one or more pairs of hydrophones;
- identifying an additional subset of the plurality of pressure sensors based on the calculated cross-correlation coefficient; and
- generating the QC-processed pressure data based on an additional portion of the pressure data corresponding to the additional subset of the plurality of pressure sensors.

8. The method of claim 1, wherein the first QC processing on the particle motion data, the second QC processing on the pressure data, the first preconditioning processing of the QC-processed particle motion data, the second preconditioning processing of the QC-processed pressure data, the noise attenuation of the preconditioned QC-processed particle motion data, and the noise attenuation of the preconditioned QC-processed pressure data are performed in real time.

9. A system, comprising:
- a memory comprising computer-executable instructions; and
- a processing system configured to execute the computer-executable instructions to cause the processing system to perform operations comprising:
  - receiving particle motion data from a plurality of particle motion sensors and pressure data from a plurality of pressure sensors disposed on a plurality of seismic streamers;

performing a first quality control (QC) processing on the particle motion data to generate QC-processed particle motion data by:
  determining a calibration of each of the plurality of particle motion sensors based on a plurality of gravity vectors corresponding to the plurality of particle motion sensors and a standard gravity vector;
  identifying a first subset of the plurality of particle motion sensors based on the calibration, wherein the first subset of the plurality of particle motion sensors is characterized as being calibrated;
  determining orientation angle errors of the first subset of the plurality of particle motion sensors based on low frequency noise of the particle motion data;
  identifying a second subset of the plurality of particle motion sensors based on the first subset and the orientation angle errors of the first subset, wherein each particle motion sensor of the second subset has a respective orientation angle error that is less than a threshold value;
  generating one or more first power spectral density curves for one or more particle motion sensors of the second subset of the plurality of particle motion sensors;
  identifying a third subset of the plurality of particle motion sensors based on the one or more first power spectral density curves and a respective first power spectral density threshold curve associated with each of the one or more particle motion sensors; and
  generating the QC-processed particle motion data based on a portion of the particle motion data corresponding to the third subset of the plurality of particle motion sensors;
performing a second QC processing on the pressure data to generate QC-processed pressure data by:
  generating one or more second power spectral density curves for one or more pressure sensors of the plurality of pressure sensors;
  identifying a subset of the plurality of pressure sensors based on the one or more second power spectral density curves and a respective second power spectral density threshold curve associated with each of the plurality of pressure sensors; and
  generating the QC-processed pressure data based on a portion of the pressure data corresponding to the subset of the plurality of pressure sensors;
performing a first preconditioning processing on the QC-processed particle motion data to generate preconditioned QC-processed particle motion data and a second preconditioning processing on the QC-processed pressure data to generate preconditioned QC-processed pressure data;
attenuating noise in the preconditioned QC-processed particle motion data; and
attenuating noise in the preconditioned QC-processed pressure data.

10. The system of claim 9, wherein the processing system is configured to execute the computer-executable instructions to cause the processing system to perform additional operations comprising:
  performing the first QC processing on the particle motion data to generate the QC-processed particle motion data, wherein the first QC processing comprises:
    identifying one or more digital spikes in the portion of the particle motion data;
    identifying one or more analog spikes in the portion of the particle motion data;
    removing the one or more digital spikes and the one or more analog spikes from the portion of the particle motion data to generate an additional portion of the particle motion data; and
    generating an additional QC-processed particle motion data based on the additional portion of the particle motion data.

11. The system of claim 9, wherein the processing system is configured to execute the computer-executable instructions to cause the processing system to perform additional operations comprising:
  performing the first preconditioning processing on the QC-processed particle motion data, wherein the first preconditioning processing comprises:
    generating one or more trace inserts for the QC-processed particle motion data to generate a first partially preconditioned QC-processed particle motion data;
    estimating one or more orientation angles of the QC-processed particle motion data;
    rotating the QC-processed particle motion data based on the one or more orientation angles to generate rotated QC-processed particle motion data;
    generating a second partially preconditioned QC-processed particle motion data based on the first partially preconditioned QC-processed particle motion data and the rotated QC-processed particle motion data;
    applying a digital low cut filter to the QC-processed particle motion data to generate filtered-QC-processed particle motion data;
    generating a third partially preconditioned QC-processed particle motion data based on the second partially preconditioned QC-processed particle motion data and the filtered-QC-processed particle motion data;
    interpolating one or more traces of the QC-processed particle motion data to generate one or more interpolated traces of the QC-processed particle motion data;
    generating a fourth partially preconditioned QC-processed particle motion data based on the third partially preconditioned QC-processed particle motion data and the one or more interpolated traces of the QC-processed particle motion data;
    performing an inline regularization on the one or more interpolated traces to generate one or more inline regularized interpolated traces;
    generating a fifth partially preconditioned QC-processed particle motion data based on the fourth partially preconditioned QC-processed particle motion data and the one or more inline regularized interpolated traces; or
    any combination thereof.

12. The system of claim 9, wherein the processing system is configured to execute the computer-executable instructions to cause the processing system to perform additional operations comprising:
  performing the second QC processing on the pressure data to generate the QC-processed pressure data, wherein the second QC processing comprises:
    identifying one or more analog spikes in the portion of the pressure data;

removing the one or more analog spikes from the portion of the pressure data to generate an additional portion of the pressure data; and
generating an additional QC-processed pressure data based on the additional portion of the pressure data.

13. The system of claim 9, wherein the processing system is configured to execute the computer-executable instructions to cause the processing system to perform additional operations comprising:
performing the second preconditioning processing on the QC-processed pressure data, wherein the second preconditioning processing comprises:
generating one or more trace inserts for the QC-processed pressure data to generate a first partially preconditioned QC-processed pressure data;
applying a digital low cut filter to the QC-processed pressure data to generate a filtered QC-processed pressure data;
generating a second partially preconditioned QC-processed pressure data based on the first partially preconditioned QC-processed pressure data and the filtered QC-processed pressure data;
interpolating one or more traces of the QC-processed pressure data to generate one or more interpolated traces of the QC-processed pressure data;
generating a third partially preconditioned QC-processed pressure data based on the second partially preconditioned QC-processed pressure data and the one or more interpolated traces of the QC-processed pressure data;
performing an inline regularization on the one or more interpolated traces of the QC-processed pressure data to generate inline regularized interpolated pressure data;
generating a fourth partially preconditioned QC-processed pressure data based on the third partially preconditioned QC-processed pressure data and the inline regularized interpolated pressure data; or
any combination thereof.

14. The system of claim 9, wherein the plurality of pressure sensors comprises one or more pairs of hydrophones.

15. The system of claim 14, wherein the processing system is configured to execute the computer-executable instructions to cause the processing system to perform additional operations comprising:
performing the second QC processing on the pressure data to generate the QC-processed pressure data, wherein the second QC processing comprises:
calculating a cross-correlation coefficient for individual hydrophones of a respective pair of the one or more pairs of hydrophones;
identifying an additional subset of the plurality of pressure sensors based on the calculated cross-correlation coefficient; and
generating the QC-processed pressure data based on an additional portion of the pressure data corresponding to the additional subset of the plurality of pressure sensors.

16. The system of claim 9, wherein the first QC processing on the particle motion data, the second QC processing on the pressure data, the first preconditioning processing of the QC-processed particle motion data, the second preconditioning processing of the QC-processed pressure data, the noise attenuation of the preconditioned QC-processed particle motion data, and the noise attenuation of the preconditioned QC-processed pressure data are performed in real time.

17. A non-transitory computer-readable medium, comprising instructions that when executed by a processing system, are configured to cause the processing system to perform operations comprising:
receiving particle motion data from a plurality of particle motion sensors and pressure data from a plurality of pressure sensors disposed on a plurality of seismic streamers;
performing a first quality control (QC) processing on the particle motion data to generate QC-processed particle motion data by:
determining a calibration of each of the plurality of particle motion sensors based on a plurality of gravity vectors corresponding to the plurality of particle motion sensors and a standard gravity vector;
identifying a first subset of the plurality of particle motion sensors based on the calibration, wherein the first subset of the plurality of particle motion sensors is characterized as being calibrated;
determining orientation angle errors of the first subset of the plurality of particle motion sensors based on low frequency noise of the particle motion data;
identifying a second subset of the plurality of particle motion sensors based on the first subset and the orientation angle errors of the first subset, wherein each particle motion sensor of the second subset has a respective orientation angle error that is less than a threshold value;
generating one or more first power spectral density curves for one or more particle motion sensors of the second subset of the plurality of particle motion sensors;
identifying a third subset of the plurality of particle motion sensors based on the one or more first power spectral density curves and a respective first power spectral density threshold curve associated with each of the one or more particle motion sensors; and
generating the QC-processed particle motion data based on a portion of the particle motion data corresponding to the third subset of the plurality of particle motion sensors;
performing a second QC processing on the pressure data to generate QC-processed pressure data by:
generating one or more second power spectral density curves for one or more pressure sensors of the plurality of pressure sensors;
identifying a subset of the plurality of pressure sensors based on the one or more second power spectral density curves and a respective second power spectral density threshold curve associated with each of the plurality of pressure sensors; and
generating the QC-processed pressure data based on a portion of the pressure data corresponding to the subset of the plurality of pressure sensors;
performing a first preconditioning processing on the QC-processed particle motion data to generate preconditioned QC-processed particle motion data and a second preconditioning processing on the QC-processed pressure data to generate preconditioned QC-processed pressure data;
attenuating noise in the preconditioned QC-processed particle motion data; and
attenuating noise in the preconditioned QC-processed pressure data.

18. The non-transient computer-readable medium of claim 17, wherein the instructions, when executed by a processing system, are configured to cause the processing system to perform additional operations comprising:
performing the first QC processing on the particle motion data to generate the QC-processed particle motion data, wherein the first QC processing comprises:
identifying one or more digital spikes in the portion of the particle motion data;
identifying one or more analog spikes in the portion of the particle motion data;
removing the one or more digital spikes and the one or more analog spikes from the portion of the particle motion data to generate an additional portion of the particle motion data; and
generating an additional QC-processed particle motion data based on the additional portion of the particle motion data.

19. The non-transient computer-readable medium of claim 17, wherein the instructions, when executed by a processing system, are configured to cause the processing system to perform additional operations comprising:
performing the first preconditioning processing on the QC-processed particle motion data, wherein the first preconditioning processing comprises:
generating one or more trace inserts for the QC-processed particle motion data to generate a first partially preconditioned QC-processed particle motion data;
estimating one or more orientation angles of the QC-processed particle motion data;
rotating the QC-processed particle motion data based on the one or more orientation angles to generate rotated QC-processed particle motion data;
generating a second partially preconditioned QC-processed particle motion data based on the first partially preconditioned QC-processed particle motion data and the rotated QC-processed particle motion data;
applying a digital low cut filter to the QC-processed particle motion data to generate filtered-QC-processed particle motion data;
generating a third partially preconditioned QC-processed particle motion data based on the second partially preconditioned QC-processed particle motion data and the filtered-QC-processed particle motion data;
interpolating one or more traces of the QC-processed particle motion data to generate one or more interpolated traces of the QC-processed particle motion data;
generating a fourth partially preconditioned QC-processed particle motion data based on the third partially preconditioned QC-processed particle motion data and the one or more interpolated traces of the QC-processed particle motion data;
performing an inline regularization on the one or more interpolated traces to generate one or more inline regularized interpolated traces;
generating a fifth partially preconditioned QC-processed particle motion data based on the fourth partially preconditioned QC-processed particle motion data and the one or more inline regularized interpolated traces; or
any combination thereof.

20. The non-transient computer-readable medium of claim 17, wherein the instructions, when executed by a processing system, are configured to cause the processing system to perform additional operations comprising:
performing the second preconditioning processing on the QC-processed pressure data, wherein the second preconditioning processing comprises:
generating one or more trace inserts for the QC-processed pressure data to generate a first partially preconditioned QC-processed pressure data;
applying a digital low cut filter to the QC-processed pressure data to generate a filtered QC-processed pressure data;
generating a second partially preconditioned QC-processed pressure data based on the first partially preconditioned QC-processed pressure data and the filtered QC-processed pressure data;
interpolating one or more traces of the QC-processed pressure data to generate one or more interpolated traces of the QC-processed pressure data;
generating a third partially preconditioned QC-processed pressure data based on the second partially preconditioned QC-processed pressure data and the one or more interpolated traces of the QC-processed pressure data;
performing an inline regularization on the one or more interpolated traces of the QC-processed pressure data to generate inline regularized interpolated pressure data;
generating a fourth partially preconditioned QC-processed pressure data based on the third partially preconditioned QC-processed pressure data and the inline regularized interpolated pressure data; or
any combination thereof.

* * * * *